(12) United States Patent
Miyashita et al.

(10) Patent No.: US 12,502,876 B2
(45) Date of Patent: Dec. 23, 2025

(54) LAMINATE

(71) Applicant: Toray Industries, Inc., Tokyo (JP)

(72) Inventors: Masanori Miyashita, Otsu (JP); Kentaro Mori, Otsu (JP)

(73) Assignee: Toray Industries, Inc., Tokyo (JP)

( * ) Notice: Subject to any disclaimer, the term of this patent is extended or adjusted under 35 U.S.C. 154(b) by 405 days.

(21) Appl. No.: 18/027,197

(22) PCT Filed: Sep. 17, 2021

(86) PCT No.: PCT/JP2021/034297
§ 371 (c)(1),
(2) Date: Mar. 20, 2023

(87) PCT Pub. No.: WO2022/065227
PCT Pub. Date: Mar. 31, 2022

(65) Prior Publication Data
US 2023/0364896 A1  Nov. 16, 2023

(30) Foreign Application Priority Data
Sep. 24, 2020  (JP) .................................. 2020-159802

(51) Int. Cl.
*B32B 27/12* (2006.01)
*B32B 5/02* (2006.01)
(Continued)

(52) U.S. Cl.
CPC .............. *B32B 27/12* (2013.01); *B32B 5/02* (2013.01); *B32B 27/286* (2013.01); *B32B 27/36* (2013.01);
(Continued)

(58) Field of Classification Search
CPC ......... B32B 27/12; B32B 5/02; B32B 27/286; B32B 27/36; B32B 27/40;
(Continued)

(56) References Cited

U.S. PATENT DOCUMENTS 6,054,224 A * 4/2000 Nagai .................... H01B 3/422
428/458
2011/0236676 A1 9/2011 Kimura et al.
(Continued)

FOREIGN PATENT DOCUMENTS

CN 103843070 A 6/2014
CN 104812580 A 7/2015
(Continued)

OTHER PUBLICATIONS

Office Action (Communication pursuant to Article 94(3) EPC) issued May 8, 2025, by the European Patent Office in corresponding European Patent Application No. 21 872 356.7-1102. (4 pages).
(Continued)

*Primary Examiner* — Michael B Nelson
(74) *Attorney, Agent, or Firm* — Buchanan Ingersoll & Rooney PC (57) ABSTRACT

The present invention relates to a laminate including a film A, a film B, and a film C in this order via adhesive layers, in which the adhesive layers includes an adhesive layer AB and an adhesive layer BC, the adhesive layer AB exists between the films A and B, and the adhesive layer BC exists between the films B and C, a maximum value of a thermal shrinkage rate of the film B at 150° C. for 30 minutes is 0.1% or more and 3.0% or less, the adhesive layer AB and the adhesive layer BC each have a Martens hardness of 1.0 N/mm² or more and 4.0 N/mm² or less, and an adhesion area ratio between the films A and B via the adhesive layer AB and an adhesion area ratio between the films B and C via the adhesive layer BC are both 95% or more.

6 Claims, 1 Drawing Sheet

(51) Int. Cl.
*B32B 27/28* (2006.01)
*B32B 27/36* (2006.01)
*B32B 27/40* (2006.01)

(52) U.S. Cl.
CPC ........ *B32B 27/40* (2013.01); *B32B 2307/206* (2013.01); *B32B 2307/536* (2013.01); *B32B 2307/736* (2013.01)

(58) Field of Classification Search
CPC ........ B32B 2307/206; B32B 2307/536; B32B 2307/736; B32B 2255/26; B32B 2605/00; B32B 7/12; B32B 27/08; B32B 2307/30; B32B 2255/10; B32B 2262/0269; B32B 27/16; B32B 27/281; B32B 2250/40; H02K 3/30
See application file for complete search history.

(56) References Cited

U.S. PATENT DOCUMENTS

| | | | |
|---|---|---|---|
| 2012/0205030 A1 | 8/2012 | Kiuchi et al. | |
| 2013/0196161 A1 | 8/2013 | Kang et al. | |
| 2015/0352811 A1 | 12/2015 | Kashiwagi et al. | |

FOREIGN PATENT DOCUMENTS

| | | | |
|---|---|---|---|
| JP | 05338084 A | 12/1993 | |
| JP | 2006262687 A | 9/2006 | |
| JP | 2014529842 A | 11/2014 | |
| JP | 2016163948 A | 9/2016 | |
| JP | 2019127033 A | 8/2019 | |
| JP | 2020163855 A | 10/2020 | |
| TW | 201241135 A | 10/2012 | |
| WO | 2010/064583 A1 | 6/2010 | |
| WO | 2017199703 A1 | 11/2017 | |

OTHER PUBLICATIONS

The extended European Search Report issued Sep. 13, 2024, by the European Patent Office in corresponding European Patent Application No. 21872356.7-1102. (7 pages).
International Search Report and Written Opinion for International Application No. PCT/JP2021/034297, dated Nov. 22, 2021, 6 pages.
Japanese Notice of Reasons for Refusal for Japanese Application No. 2021-556738, dated Mar. 10, 2022, with translation, 8 pages.
Office Action (Notification for the Opinion of Examination) issued Dec. 26, 2024, by the Taiwan Intellectual Property Office Ministry of Economic Affairs in corresponding Taiwanese Patent Application No. 110135061 and an English translation of the Office Action. (8 pages).
Office Action (First Office Action Notification) issued May 12, 2025, by the National Intellectual Property Administration, P. R. China in corresponding Chinese Patent Application No. 202180064823.9 and an English translation of the Office Action. (15 pages).

* cited by examiner

LAMINATE

CROSS REFERENCE TO RELATED APPLICATIONS

This application is the U.S. National Phase application of PCT/JP2021/034297, filed Sep. 17, 2021, which claims priority to Japanese Patent Application No. 2020-159802, filed Sep. 24, 2020, the disclosures of these applications being incorporated herein by reference in their entireties for all purposes.

FIELD OF THE INVENTION

The present invention relates to a laminate and is suitably used for an electrical insulating film of a motor.

BACKGROUND OF THE INVENTION

As an insulating material for a drive motor of an electric automatic vehicle or a hybrid automatic vehicle or a motor for a compressor (for business use, household use, or in-vehicle air conditioner use), a polyester film excellent in electrical insulation properties or mechanical strength, an aramid nonwoven fabric or a polyphenylene sulfide film having improved properties such as heat resistance or chemical resistance, or a laminate obtained by laminating these films has been commonly used.

For example, a laminate obtained by laminating an aramid nonwoven fabric or a polyphenylene sulfide film having excellent durability is laminated on a relatively inexpensive polyester film has been studied. Patent Literature 1 discloses a laminate obtained by laminating polyphenylene sulfide films on both surfaces of a polyethylene terephthalate film via adhesive layers. Patent Literature 2 discloses a laminate obtained by laminating aramid nonwoven fabrics on both surfaces of a polyethylene terephthalate film via adhesive layers.

PATENT LITERATURE

Patent Literature 1: JP2016-163948A
Patent Literature 2: JP2006-262687A

SUMMARY OF THE INVENTION

In recent years, operating temperature has increased due to miniaturization and high output of a motor, and an insulating material used for a motor is required to have an improvement in durability under a high-temperature environment. In addition, the number of oil cooling motors that are cooled by applying oil called an automatic transmission fluid to the motor is increasing with an increase in the operating temperature, and the insulating material is also required to have an improvement in durability (oil resistance) against the automatic transmission fluid. In addition, the automatic transmission fluid contains a trace amount of moisture, and the insulating material is also required to have moisture and heat resistance. At the same time, with the spread of products, there is a high demand for reduction in manufacturing cost, and there is a demand for an insulator that is inexpensive and excellent in durability, and thus various studies have been made.

The laminate using the adhesive layer of Patent Literature 1 or 2 was useful in terms of electrical insulation properties and mechanical strength, but recently, it is hoped to develop a more useful laminate that includes an adhesive layer that has high heat resistance and is less likely to melt out in a case of being exposed to a high-temperature environment. In addition, there is also a demand for a laminate in which a cohesive force of an adhesive layer is improved and a laminate in which peeling caused by application of a shear stress to an interface between an adhesive layer and a film due to thermal shrinkage of the film is prevented. There is also a demand for a laminate in which, when the laminate is immersed in an automatic transmission fluid, the oil resistance of the adhesive layer and moisture and heat resistance against a trace amount of moisture contained in the automatic transmission fluid are high, and peeling due to hydrolysis of the adhesive layer or swelling of oil is prevented. It has been expected that a decrease in electrical insulation properties of a laminate and a motor using the laminate is prevented by preventing melting and peeling of the adhesive layer.

An object of the present invention is to provide a laminate excellent in adhesion, processability, heat resistance, moisture and heat resistance, and oil resistance. More specifically, an object of the present invention is also to provide a laminate suitably used for an electrical insulating film of a motor even under a severe high-temperature environment.

In order to solve the above problems, a preferred aspect of the present invention includes the following configuration.

(1) A laminate including a film A, a film B, and a film C in this order via adhesive layers,
  in which the adhesive layers include an adhesive layer AB and an adhesive layer BC,
  the adhesive layer AB exists between the film A and the film B, and the adhesive layer BC exists between the film B and the film C,
  a maximum value of a thermal shrinkage rate of the film B at 150° C. for 30 minutes is 0.1% or more and 3.0% or less,
  the adhesive layer AB and the adhesive layer BC each have a Martens hardness of 1.0 N/mm$^2$ or more and 4.0 N/mm$^2$ or less, and
  when the laminate is immersed in an automatic transmission fluid and subjected to a heat treatment at 150° C. for 10 hours, an adhesion area ratio between the film A and the film B via the adhesive layer AB and an adhesion area ratio between the film B and the film C via the adhesive layer BC are both 95% or more.

(2) The laminate according to (1), in which a dispersive component of surface free energy of each of the adhesive layer AB and the adhesive layer BC is 20 mN/m or more and 40 mN/m or less, and a sum of a polar component and a hydrogen bonding component is 5 mN/m or more and 20 mN/m or less.

(3) The laminate according to (1) or (2), in which each of the adhesive layer AB and the adhesive layer BC contains, as main components, a polyether resin having an active hydrogen group and an isocyanate resin and/or a polyester resin having an active hydrogen group and an isocyanate resin.

(4) The laminate according to (3), in which the isocyanate resin contains, as a main component, a nurate-modified product of isophorone diisocyanate.

(5) The laminate according to (3) or (4), in which the active hydrogen group of the polyether resin and/or the polyester resin is a hydroxy group,
  and a reaction equivalent ratio (NCO/OH) of the hydroxy group is 0.7 or more and 0.95 or less.

(6) The laminate according to any one of (1) to (5), in which either the film A or the film C is at least one selected from a sheet made of aromatic polyamide fibers and a polyphenylene sulfide film, and another film is at least one selected from a polyphenylene sulfide film, a polyimide film, a polyethylene naphthalate film, and a polyethylene terephthalate film.

(7) The laminate according to any one of (1) to (6), in which each of the film A and the film C is a sheet made of aromatic polyamide fibers, and the film B is at least one selected from a polyphenylene sulfide film, a polyimide film, a polyethylene naphthalate film, and a polyethylene terephthalate film.

(8) The laminate according to any one of (1) to (6), in which each of the film A and the film C is a polyphenylene sulfide film, and the film B is a polyethylene terephthalate film.

(9) The laminate according to any one of (1) to (8), being used for an electrical insulating film of a motor.

According to the present invention, a laminate satisfying adhesion, processability, oil resistance, heat resistance, and moisture and heat resistance can be obtained, and the laminate can be suitably used for an electrical insulating film of a motor even in a high-temperature environment.

BRIEF DESCRIPTION OF DRAWINGS

The FIG. 1s a side view of a laminate according to an embodiment of the present invention.

DETAILED DESCRIPTION OF EMBODIMENTS OF THE INVENTION

Figure 1:
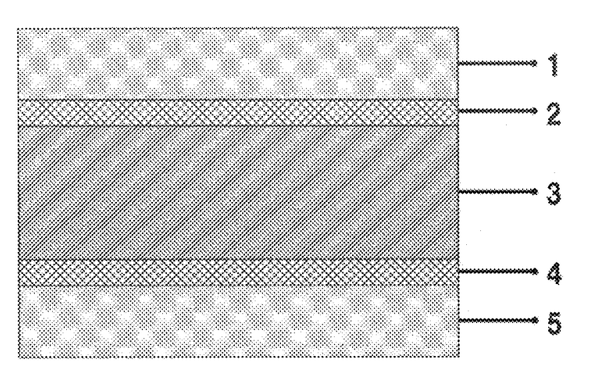

The laminate according to the present invention will be described below.

A preferred aspect of the laminate according to the present invention includes a laminate having a film A, a film B, and a film C in this order via adhesive layers (the adhesive layer between the film A and the film B is referred to as an adhesive layer AB, and the adhesive layer between the film B and the film C is referred to as an adhesive layer BC). The laminate according to the present invention can be suitably used as an electrical insulating film of a motor. In the case where the laminate is used as an electrical insulating film of a motor, the film A and the film C are required to have heat resistance because the film A and the film C are in contact with a coil which is a heat generating part of the motor. The film B is similarly required to have heat resistance, and in addition to electrical insulation between the coil and a motor outer shell material, the film B is also required to have a balance between the mechanical strength necessary for molding processing described later and manufacturing cost. In addition, regarding the adhesive layers, adhesion between the films and particularly no peeling in a durability test are required.

In the laminate according to the present invention, it is important that the maximum value of the thermal shrinkage rate of the film B at 150° C. for 30 minutes is 0.1% or more and 3.0% or less. The maximum value of the thermal shrinkage rate after a heat treatment at 150° C. for 30 minutes can be measured by the following method. First, a sample of 20 mm×150 mm having a long side in any direction is collected, subjected to a heat treatment at 150° C. for 30 minutes, and then a dimensional change in a long side direction is measured by the method described in JIS C 2151 (2006). Next, a sample of 20 mm×150 mm having a long side defined by a straight line obtained by rotating a long side of the previous sample rightward by 5° from the long side direction of the previous sample is collected and subjected to the same measurement, and this procedure is repeated until an angle with the long side direction of the first sample becomes 175°. The largest value among all the obtained values is defined as the maximum value of the thermal shrinkage rate. The thermal shrinkage rate of 0.0% means that there is no change in dimensions before and after the heat treatment. In the case where the film B expands due to heating, the thermal shrinkage rate is expressed by a minus notation. In the case where the maximum value of the thermal shrinkage rate after the heat treatment at 150° C. for 30 minutes is more than 3.0%, a shear stress is strongly applied to an interface between the adhesive and each film due to large shrinkage, and peeling may occur at the interface between the adhesive layer and each film. In the case where the maximum value of the thermal shrinkage rate is less than 0.1%, it is necessary to mainly perform an annealing treatment (heat treatment) for a long time, and thus the thermal load becomes too large, the smoothness of the film B decreases, and when the film A and the film C are attached via the adhesive layer, a contact area with the adhesive may decrease, and the adhesion strength may decrease. Therefore, the lower limit of the maximum value of the thermal shrinkage rate is 0.1%. From the same viewpoint as described above, the maximum value of the thermal shrinkage rate of the film B at 150° C. for 30 minutes is more preferably 0.1% or more and 2.3% or less, and still more preferably 0.1% or more and 1.5% or less.

Examples of a method for adjusting the maximum value of the thermal shrinkage rate of the film B include an annealing treatment. The annealing treatment can be performed, for example, by heating the film B in an oven. The temperature of the annealing treatment is preferably 150° C. to 180° C., and the time for performing the annealing treatment is preferably 10 seconds to 60 seconds. The film B may be subjected to the annealing treatment after being cut into a size easy to be handled, or may be subjected to the annealing treatment by being wound off from a roll and passed through an oven. The method in which the film B is wound off from the roll and passed through the oven is preferred since the method enables continuous treatments and is excellent in the productivity.

In the laminate according to the present invention, it is important that the Martens hardness of each of the adhesive layer AB and the adhesive layer BC is 1.0 N/mm$^2$ or more and 4.0 N/mm$^2$ or less. The Martens hardness can be measured and calculated by an indentation test method in conformity with ISO14577, and can be measured using a microhardness test system (trade name: "PICODENTOR®" HM500, manufactured by Fischer Instruments K.K.). In the measurement method, an indentor is a Vickers indentor, and an indentor having a diamond square pyramid shape and a maximum diameter of 400 μm can be used. In order to eliminate dependence on the thickness of the adhesive layer, an indentation load is set as small as 0.1 mN, and an indentation depth is set to about 1 μm.

In the case where the Martens hardness is less than 1.0 N/mm$^2$, the cohesive force and the heat resistance of the adhesive layer are insufficient, and in the case where the laminate is used as an electrical insulating film of a motor, foaming and elution of the adhesive portion occur when the temperature of the motor increases, and the electrical insulation properties of the motor may decrease. In the case where the Martens hardness is more than 4.0 N/mm$^2$, the cohesive force of the adhesive layer is too high and the conformability to a base material film deteriorates, and thus sufficient adhesion strength between the film A and the film B and between the film B and the film C may not be obtained. From the same viewpoint as described above, the Martens hardness of each of the adhesive layer AB and the adhesive layer BC is more preferably 1.5 N/mm² or more and 4.0 N/mm² or less. The Martens hardness can be adjusted by changing the kind of a polyether resin or a polyester resin having an active hydrogen group, which will be described later, and the kind or amount of an isocyanate resin.

Regarding the laminate according to the present invention, it is important that an adhesion area ratio of the film A and the film B via the adhesive layer AB and an adhesion area ratio of the film B and the film C via the adhesive layer BC, when the laminate is immersed in an automatic transmission fluid and subjected to a heat treatment at 150° C. for 10 hours, are both 95% or more. The adhesion area ratio is measured by the following method. First, a laminate sample of 100 mm×100 mm is collected, immersed in an automatic transmission fluid, and subjected to a heat treatment at 150° C. for 10 hours. Next, after the mass of the sample after the heat treatment is measured, a portion where peeling occurs between the films and a portion where air bubbles are generated between the films are cut in the thickness direction in a manner of including the film A, the film B, and the film C. The mass of the sample after cutting is measured, and the ratio before and after cutting is defined as the adhesion area ratio. The automatic transmission fluid (hereinafter, may be abbreviated as an auto fluid) refers to the oil used for lubrication, cooling, and cleaning of a transmission for an automatic vehicle. The auto fluid is not particularly limited as long as it is generally used, and is generally one obtained by blending various additives in a base oil. The base oil is generally a mineral base oil, a synthetic base oil, or a mixture thereof. Examples of the additive component include a viscosity modifier and a friction modifier. As the auto fluid, for example, MATIC FLUID S (manufactured by Nissan Motor Co., Ltd.), AUTO FLUID WS (manufactured by Toyota Motor Corporation), and ATF DW-1 (manufactured by Honda Motor Co., Ltd.) can be used.

In the case where the adhesion area ratio of each of the films via the adhesive layer after the heat treatment at 150° C. for 10 hours in a state that the laminate is immersed in the automatic transmission fluid is less than 95%, the electrical insulation properties of the laminate may decrease and the electrical insulation properties of the motor may decrease since peeling occurs between the films due to foaming and elution of the adhesive layer.

Regarding the laminate according to the present invention, it is important that the maximum value of the thermal shrinkage rate of the film B at 150° C. for 30 minutes is 0.1% or more and 3.0% or less, the Martens hardness of the adhesive layer is 1.0 N/mm² or more and 4.0 N/mm² or less, and when the laminate is immersed in an automatic transmission fluid and subjected to a heat treatment at 150° C. for 10 hours, the adhesion area ratio of the film A and the film B via the adhesive layer AB and the adhesion area ratio of the film B and the film C via the adhesive layer BC are both 95% or more. When all of these conditions are satisfied, sufficient cohesive force, heat resistance, and oil resistance can be imparted to the adhesive layer while ensuring adhesion between the films. Therefore, even when exposed to an auto fluid under a high-temperature environment, peeling does not occur between the respective films and adhesive layers, and electrical insulation properties can be ensured.

From the viewpoint of the adhesion area ratio, a preferable range of the maximum value of the thermal shrinkage rate of the film B at 150° C. for 30 minutes and the Martens hardness of the adhesive layer preferably satisfies the following expression where Y is the maximum value of the thermal shrinkage rate and X is the Martens hardness of the adhesive layer.

$$Y \leq 6.3X - 6.9$$

Regarding the laminate according to the present invention, a dispersive component of a surface free energy of each of the adhesive layer AB and the adhesive layer BC is preferably 20 mN/m or more and 40 mN/m or less, and a sum of a polar component and a hydrogen bonding component is preferably 5 mN/m or more and 20 mN/m or less. In other words, it is preferable that the dispersive component of the surface free energy of the adhesive layer AB be 20 mN/m or more and 40 mN/m or less, the dispersive component of the surface free energy of the adhesive layer BC be 20 mN/m or more and 40 mN/m or less, the sum of the polar component and the hydrogen bonding component of the adhesive layer AB be 5 mN/m or more and 20 mN/m or less, and the sum of the polar component and the hydrogen bonding component of the adhesive layer BC be 5 mN/m or more and 20 mN/m or less. The value of the surface free energy are obtained from a contact angle (θ), on the film, of each of four liquids of water, ethylene glycol, formamide, and methylene iodide, whose value of the surface free energy and values of the dispersive component, the polar component, and the hydrogen bonding component that are components of the surface free energy are known, using a contact angle meter CA-D type (manufactured by Kyowa Interface Science Co., Ltd.). The values of the dispersive component, the polar component, and the hydrogen bonding component on the surfaces of the adhesive layer AB and the adhesive layer BC are determined based on the value of the contact angle and eigenvalues of the dispersive component, the polar component, and the hydrogen bonding component of each liquid (according to the method IV based on Panzer (described in Japan Glue Association vol. 15, No. 3, p 96)) using the following expression derived from the extended Fowkes equation and the Young equation.

$$(\gamma Sd \cdot \gamma Ld)^{1/2} + (\gamma Sp \cdot \gamma Lp)^{1/2} + (\gamma Sh \cdot \gamma Lh)^{1/2} = (1 + \cos \theta)/2$$

In the expression, γLd, γLp, and γLh represent eigenvalues of the dispersive component, the polar component, and the hydrogen bonding component, of each of measurement liquids, respectively (according to the method IV based on Panzer (described in Japan Glue Association vol. 15, No. 3, p 96)), θ represents an average value of contact angles of the measurement liquids on the measurement surface, and γSd, γSp, and γSh represent values of the dispersive component, the polar component, and the hydrogen bonding component, on the surfaces of the adhesive layer AB and the adhesive layer BC, respectively. The values of the three components of the measurement surface are obtained by solving simultaneous equations obtained by assigning the eigenvalues and θ into the above expression. The sum of the determined values of the dispersive component, the polar component, and the hydrogen bonding component is the value of the surface free energy.

In the case where the dispersive component of the surface free energy of each of the adhesive layer AB and the adhesive layer BC is less than 20 mN/m and the sum of the polar component and the hydrogen bonding component is more than 20 mN/m, the hydrophobicity of the adhesive layer may not be sufficiently obtained, and sufficient durability may not be obtained due to hydrolysis or swelling of the adhesive layer caused by a trace amount of water contained in the auto fluid. In the case where the dispersive component is more than 40 mN/m and the sum of the polar component and the hydrogen bonding component is less than 5 mN/m, the hydrophobicity of the adhesive layer is high, the affinity with the mineral oil which is the main component of the auto fluid is high, and the adhesive layer may swell by the auto fluid to cause peeling of the film. From the viewpoint of the adhesion area ratio, it is more preferable that the dispersive component of the surface free energy of each of the adhesive layer AB and the adhesive layer BC be 39.8 mN/m or less, and the sum of the polar component and the hydrogen bonding component be 5.0 mN/m or more.

The dispersive component, the polar component, and the hydrogen bonding component of each of the adhesive layer AB and the adhesive layer BC can be adjusted by changing the kind of the polyether resin or the polyester resin having an active hydrogen group, which will be described later, and the kind and the amount of the isocyanate resin.

In the laminate according to the present invention, the adhesive layer AB and the adhesive layer BC preferably contain a resin having an active hydrogen group, and an isocyanate resin. Examples of the resin having an active hydrogen group include a polyether resin, a polyester resin, an acrylic resin, and a polycarbonate resin. The polyether resin is preferred from the viewpoint that hydrolysis of a polymer main chain can be prevented in a high temperature and high humidity environment and the durability against hydrolysis is high, and/or the polyester resin is preferred, and the polyether resin is more preferred from the viewpoint of having heat resistance. In order to impart a crosslinked structure to the adhesive layer from the viewpoint of improving the cohesive force and heat resistance of the adhesive layer, it is preferable to contain an isocyanate resin having high reactivity with an active hydrogen group. The active hydrogen group refers to a group having active hydrogen, such as a hydroxy group, a carboxy group, a mercapto group, and a primary or secondary amino group, and is preferably a hydroxy group having high reactivity with an isocyanate resin. In addition, it is more preferable that each of the adhesive layer AB and the adhesive layer BC contain, as main components, a polyether resin having an active hydrogen group and an isocyanate resin and/or a polyester resin having an active hydrogen group and an isocyanate resin. It is still more preferable that each of the adhesive layer AB and the adhesive layer BC contain, as main components, a polyether resin having a hydroxy group as an active hydrogen group and an isocyanate resin and/or a polyester resin having a hydroxy group as an active hydrogen group and an isocyanate resin. It is particularly preferable that the adhesive layer AB and the adhesive layer BC contain, as main components, a polyether resin having a hydroxy group as an active hydrogen group and an isocyanate resin or a polyester resin having a hydroxy group as an active hydrogen group and an isocyanate resin.

The phrase "containing, as main components, a polyether resin having an active hydrogen group and an isocyanate resin" means that a total content of the polyether resin having an active hydrogen group and the isocyanate resin is more than 50 mass % based on 100 mass % of the raw material solid content of the layer.

The phrase "containing, as main components, a polyester resin having an active hydrogen group and an isocyanate resin" means that a total content of the polyester resin having an active hydrogen group and the isocyanate resin is more than 50 mass % based on 100 mass % of the raw material solid content of the layer.

The phrase "containing, as main components, a polyether resin having an active hydrogen group and an isocyanate resin, and a polyester resin having an active hydrogen group and an isocyanate resin" means that a total content of the polyether resin having an active hydrogen group, the polyester resin having an active hydrogen group, and the isocyanate resin is more than 50 mass % based on 100 mass % of the raw material solid content of the layer.

Examples of the polyether resin having an active hydrogen group include polyether polyols obtained by polymerizing an oxirane compound such as ethylene oxide, propylene oxide, butylene oxide, and tetrahydrofuran using a low molecular weight polyol, such as water, ethylene glycol, propylene glycol, trimethylolpropane, and glycerin, as an initiator. Other than bifunctional compounds, compounds having three or more functional groups may be used. A plurality of compounds having different numbers of functional groups may be used in combination. Among them, preferred is a product synthesized by causing a polyalkylene glycol and an alkanediol monomer having repeating units each having 3 or 4 carbon atoms to react with an organic diisocyanate at a predetermined ratio, that is, a polyether polyurethane polyol. In the case of a polyether polyurethane polyol having repeating units each having 1 or 2 carbon atoms, the polyether polyurethane polyol has high hydrophilicity and tends to easily swell by absorbing moisture, and as a result, the moisture and heat resistance may deteriorate. Since a polyether polyurethane polyol having repeating units each having 5 or more carbon atoms has high crystallinity, it may be difficult to prepare such a polyether polyurethane polyol.

Examples of the polyalkylene glycol used for synthesizing the polyether polyurethane polyol include polytrimethylene glycol and polypropylene glycol both of which have repeating units each having 3 carbon atoms, and polytetramethylene glycol and polybutylene glycol both of which have repeating units each having 4 carbon atoms. Among them, polyalkylene glycols containing at least one of polytetramethylene glycol and polypropylene glycol are preferably used, and polyalkylene glycols containing polytetramethylene glycol are more preferably used. This is because polytetramethylene glycol has particularly high water resistance, appropriate crystallinity, and high moisture and heat resistance.

As the organic diisocyanate used for synthesizing the polyether polyurethane polyol, it is preferable to use an aliphatic diisocyanate or an alicyclic diisocyanate whose isocyanate group is not directly bonded to an aromatic ring. The aliphatic diisocyanate or the alicyclic diisocyanate is less likely to be multimerized (for example, dimerized) even when deterioration due to heat occurs, and thus can be prevented from being discolored with time (changed to yellow).

The weight average molecular weight of the polyether resin having an active hydrogen group is preferably within the range of 35,000 to 70,000. In the case where the weight average molecular weight is less than 35,000, the initial cohesive force of the adhesive layer composition becomes insufficient, and lifting may occur between the films when the polyethylene terephthalate film and the polyphenylene sulfide film adhere to each other. On the other hand, in the case where the weight average molecular weight exceeds 70,000, the initial cohesive force of the adhesive layer composition is sufficient, but the viscosity becomes too high, and the coating method may be limited.

Examples of the polyester resin having an active hydrogen group include polyester polyols obtained by polycondensing aliphatic dicarboxylic acids (for example, succinic acid, adipic acid, sebacic acid, glutaric acid, and azelaic acid) and/or aromatic dicarboxylic acids (for example, isophthalic acid and terephthalic acid) with low molecular weight glycols (for example, ethylene glycol, 1,2-propylene glycol, 1,3-propylene glycol, 1,4-butylene glycol, 1,6-hexamethylene glycol, neopentyl glycol, and 1,4-bishydroxymethylcyclohexane).

Specific examples of the polyester polyols include polyethylene adipate diol, polybutylene adipate diol, polyhexamethylene adipate diol, polyneopentyl adipate diol, polyethylene/butylene adipate diol, polyneopentyl/hexyl adipate diol, poly-3-methylpentane adipate diol, polybutylene isophthalate diol, polycaprolactone diol, and poly-3-methylvalerolactone diol.

The isocyanate resin is not particularly limited as long as it is a compound having a plurality of isocyanate groups in the molecule. Examples of the isocyanate resin include a polyisocyanate compound such as tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, tetramethylxylylene diisocyanate, naphthalene diisocyanate, triphenylmethane triisocyanate, and polymethylene polyphenyl isocyanate. One of these isocyanate resins may be used alone or two or more kinds thereof may be used in combination. In addition, a modified product such as an allophanate-modified product, a biuret-modified product, or a nurate-modified product may also be used. Among them, preferred is a nurate-modified product of isophorone diisocyanate having suitable flexibility, excellent adhesion, excellent hydrophobicity, excellent cohesive force, improved moisture and heat resistance, and improved heat resistance. It is more preferable that the above isocyanate resin contain the nurate-modified product of isophorone diisocyanate as a main component. The fact that the isocyanate resin contains the nurate-modified product of isophorone diisocyanate as a main component means that more than 50 mass % of the nurate-modified product of isophorone diisocyanate is contained in 100 mass % of the isocyanate components contained in the adhesive layer raw material.

As a blending ratio of the isocyanate resin, a reaction equivalent ratio (NCO/OH) of an isocyanate group of the isocyanate resin to a hydroxy group that is an active hydrogen group is preferably 0.7 or more and 0.95 or less. In the case where the reaction equivalent ratio (NCO/OH) is less than 0.7, crosslinking with the isocyanate resin may be insufficient, and heat resistance may decrease. In the case where the reaction equivalent ratio (NCO/OH) is more than 0.95, the cohesive force of the adhesive becomes too high and the adhesive becomes too hard, and thus the adhesion strength between the films may decrease.

Regarding the adhesive layer according to the present invention, it is preferable that an active hydrogen group of the polyether resin and/or the polyester resin having an active hydrogen group be a hydroxy group, the nurate-modified isophorone diisocyanate resin be contained, and the reaction equivalent ratio (NCO/OH) of the hydroxy group be 0.7 or more and 0.95 or less. When all of these conditions are satisfied, sufficient cohesive force and heat resistance are imparted to the adhesive layer, and a resin skeleton has excellent moisture and heat resistance Therefore, even when exposed to a high temperature and high humidity environment, peeling does not occur between each film and adhesive, and electrical insulation properties can be ensured. In addition, durability can be improved with respect to a trace amount of moisture contained in the automatic transmission fluid, and both moisture and heat resistance and oil resistance can be imparted. Among the above aspects, it is more preferable that an active hydrogen group of the polyether resin or the polyester resin having an active hydrogen group be a hydroxy group, the nurate-modified isophorone diisocyanate resin be contained, and the reaction equivalent ratio (NCO/OH) of the hydroxy group be 0.7 or more and 0.95 or less.

The adhesive layer can be formed by coating each film with a coating material including the adhesive layer by a coating method such as a roll coating method, a gravure roll coating method, and a kiss coating method, or a printing method, and drying the coating material. The coating amount of the adhesive layer is preferably 1 $g/m^2$ to 30 $g/m^2$, and more preferably 3 $g/m^2$ to 20 $g/m^2$ in terms of the solid component in a dry state. In the case where the coating amount is less than 1 $g/m^2$, the cohesive force of the adhesive layer becomes insufficient, and the adhesion may deteriorate. In the case where the coating amount is more than 30 $g/m^2$, the shrinkage stress of the adhesive layer is too high, so that the stress inside the roll when the laminate is wound in a roll shape becomes too large, and wrinkles may occur. In addition, the productivity may decrease due to adhesion of dust during cutting to the slit or the adhesive layer of the cross section exposed by punching and cutting. In addition, the economic efficiency may deteriorate. The laminate according to the present invention can be obtained by bonding the film A, the film B, and the film C with adhesive layers.

The various adhesive layers may contain, as necessary, one or more additives such as a heat stabilizer, an oxidation stabilizer, an ultraviolet absorber, an ultraviolet stabilizer, an organic/inorganic lubricant, organic/inorganic fine particles, a filler, a nucleating agent, a dye, a coupling agent, and an adhesion imparting agent as long as the effects of the present invention are not impaired.

As the method for producing the laminate according to the present invention, for example, the following method can be preferably used. An adhesive is applied to the film A and dried to form the adhesive layer AB, and then the film B is laminated in a manner of being in contact with the adhesive layer AB, thereby producing an intermediate laminate. Next, an adhesive is applied to the film C and dried to form the adhesive layer BC. A surface of the film B of the intermediate laminate is laminated in a manner of being in contact with the adhesive layer BC of the film C to obtain a laminate.

The adhesive for the adhesive layer AB and the adhesive for the adhesive layer BC preferably contain, as main components, a polyether resin having an active hydrogen group and an isocyanate resin and/or a polyester resin having an active hydrogen group and an isocyanate resin in terms of the solid content. In addition, it is more preferable that the isocyanate resin contain, as a main component, a nurate-modified product of isophorone diisocyanate, and it is more preferable that the active hydrogen group contained in the adhesive for the adhesive layer AB and the adhesive for the adhesive layer BC be a hydroxy group, and the reaction equivalent ratio (NCO/OH) of the hydroxy group be 0.7 or more and 0.95 or less. The definition of each main component is based on the definition described for the adhesive layer.

In the laminate according to the present invention, it is preferable that either the film A or the film C be at least one selected from a sheet made of aromatic polyamide fibers and a polyphenylene sulfide film, and the another film be at least one selected from a polyphenylene sulfide film, a polyimide film, a polyethylene naphthalate film, and a polyethylene terephthalate film.

That is, based on the fact that the film B is at least one selected from a polyphenylene sulfide film, a polyimide film, a polyethylene naphthalate film, and a polyethylene terephthalate film, an aspect in which the film A and the film C are sheets made of aromatic polyamide fibers, an aspect in which the film A and the film C are polyphenylene sulfide films, an aspect in which the film A is a sheet made of aromatic polyamide fibers and the film C is a polyphenylene sulfide film, and an aspect in which the film C is a sheet made of aromatic polyamide fibers and the film A is a polyphenylene sulfide film are included.

The sheet made of the aromatic polyamide fibers refers to a paper-like sheet made of aromatic polyamide fibers, and is more preferably a paper-like sheet called "aramid paper" or the like, which is a sheet made of fibers (wholly aromatic polyamide fibers) which contains a condensation polymer of phenylenediamine and phthalic acid and in which a portion other than an amide group is constituted by a benzene ring. As the aramid paper, for example, a product commercially available under the trade name "NOMEX PAPER" from Dupont Teijin Advanced Papers Ltd. can be used.

By using a sheet made of aromatic polyamide fibers having excellent heat resistance or a polyphenylene sulfide film as the film A and/or the film C, durability against heat generation of a coil can be obtained when the laminate is used as a motor insulating film. By using a polyphenylene sulfide film, a polyimide film, a polyethylene naphthalate film, or a polyethylene terephthalate film as the film B, the heat resistance, oil resistance, and electrical insulation properties can be imparted. A sheet made of aromatic polyamide fibers and a polyphenylene sulfide film are excellent in heat resistance, moisture and heat resistance, and oil resistance, so that the laminate can be suitably used in applications requiring long-term durability in a high-temperature environment. Among the above, from the viewpoint of heat resistance, at least one of the film A and the film C is preferably a sheet made of aromatic polyamide fibers.

Among them, in the laminate according to the present invention, it is more preferable that the film A and the film C be sheets made of aromatic polyamide fibers, and the film B be at least one selected from a polyphenylene sulfide film, a polyimide film, a polyethylene naphthalate film, and a polyethylene terephthalate film. In particular, the film B is more preferably a polyphenylene sulfide film. The sheet made of aromatic polyamide fibers is more preferably a paper-like sheet called "aramid paper" or the like, which is a sheet made of fibers (wholly aromatic polyamide fibers) which contains a condensation polymer of phenylenediamine and phthalic acid and in which a portion other than an amide group is constituted by a benzene ring. By using the sheet made of aromatic polyamide fibers having excellent heat resistance as the film A and the film C, durability against heat generation of the coil can be further obtained when the laminate is used as a motor insulating film. Although a sheet made of aromatic polyamide fibers is excellent in heat resistance, the sheet may be poor in electrical insulation properties since it is a paper-like sheet, the heat resistance, oil resistance, and electrical insulation properties can be imparted by using a polyphenylene sulfide film as the film B. A sheet made of aromatic polyamide fibers and a polyphenylene sulfide film are excellent in heat resistance, moisture and heat resistance, and oil resistance, so that the laminate can be suitably used in applications requiring long-term durability in a high-temperature environment.

In another aspect of the laminate according to the present invention, it is preferable that the film A and the film C be polyphenylene sulfide films, and the film B be a polyethylene terephthalate film. The polyphenylene sulfide film can impart heat resistance, oil resistance, and moisture and heat resistance, while the polyethylene terephthalate film can impart electrical insulation properties, mechanical strength, in particular, mechanical strength necessary for molding of an electrical insulating film for a motor described later. Polyethylene terephthalate films are excellent in electrical insulation properties and a balance between mechanical strength and production cost, but the polyethylene terephthalate films have difficulty in heat resistance and moisture and heat resistance, and may be used in limited environments. However, in the case where the polyphenylene sulfide film having excellent heat resistance and moisture and heat resistance is contained, a laminate whose heat resistance is ensured and which is excellent in production cost can be obtained.

The polyphenylene sulfide film used for the laminate according to the present invention is, for example, a film mainly made of a resin containing 85 mol % or more of para-phenylene sulfide units represented by the following chemical formula (1), and the content of the para-phenylene sulfide units is preferably 90 mol % or more, more preferably 97 mol % or more from the viewpoint of heat resistance. As a constituent component other than para-phenylene sulfide, a configuration containing a phenylene sulfide component is preferred, and examples thereof include a meta-phenylene sulfide unit, a biphenylene sulfide unit, a biphenylene ether sulfide unit, a phenylene sulfone sulfide unit, a phenylene carbonyl sulfide unit, and a trifunctional phenylene sulfide component. The trifunctional phenylene sulfide component can be used for introducing a branched chain into the molecule, and examples thereof include a trifunctional phenylene sulfide component which can be obtained by using 1,2,4-trichlorobenzene during synthesis.

(1)

The polyphenylene sulfide film used in the laminate according to the present invention is preferably produced by, for example, the following steps. The polyphenylene sulfide raw material is melted at 290° C. to 360° C., formed into a film shape using a slit-shaped die, then wound around a casting drum having a surface temperature of 20° C. to 70° C., and cooled and solidified to obtain an unstretched film. Subsequently, the unstretched film is stretched 3.0 times to 5.0 times in the longitudinal direction at 90° C. to 120° C. to obtain a uniaxially stretched film. Thereafter, the uniaxially stretched film is introduced into a tenter, preheated at 90° C. to 120° C., then stretched 2.0 times to 4.0 times in the width direction, and subjected to a heat treatment at 200° C. to 280° C. to obtain a biaxially oriented polyphenylene sulfide film. The present invention is not limited to the production method described herein.

The polyethylene terephthalate film used in the present invention is a layer mainly made of a polyethylene terephthalate resin whose main bond linkage of a main chain has ester bonds constituted of ethylene terephthalates. It is preferable that the resin constituting the polyethylene terephthalate contain 80 mol % or more of the ethylene terephthalate constituent component in view of comprehensively determining quality, economic efficiency, and the like, and a constituent component such as ethylene-2,6-naphthalate, butylene terephthalate, and ethylene-α,β-bis(2-chlorophenoxy)ethane-4,4'-dicarboxylate may be copolymerized within a range of 20 mol % or less as long as the effect of the present invention is not impaired.

The polyethylene terephthalate film used in the present invention is preferably produced by, for example, the following steps. The polyester raw material is melted at 270° C. to 320° C., formed into a film shape using a slit-shaped die, then wound around a casting drum having a surface temperature of 20° C. to 70° C., and cooled and solidified to obtain an unstretched film. Subsequently, the unstretched film is stretched 2.5 to 3.5 times in the longitudinal direction at 60° C. to 120° C. to obtain a uniaxially stretched film. Thereafter, the uniaxially stretched film is introduced into a tenter, preheated at 100° C. to 140° C., then stretched 2.5 times to 4.0 times in the width direction, and heat-treated at 215° C. to 235° C. to obtain a biaxially oriented polyethylene terephthalate film. The strength may also be increased by further stretching the film in the vertical or horizontal direction or in both the vertical and horizontal directions again before the heat treatment. The present invention is not limited to the production method described herein. For example, the polyethylene terephthalate film may also be produced by a simultaneous biaxial stretching method without employing the two-stage stretching method as described above. Further, in order to reduce thermal shrinkage in the case where the film is exposed to a high-temperature environment, the polyethylene terephthalate film may be subjected to an annealing treatment. The annealing treatment can be performed, for example, by heating the polyethylene terephthalate film in an oven. The temperature of the annealing treatment is preferably 150° C. to 180° C., and the time for performing the annealing treatment is preferably 10 seconds to 60 seconds. The polyethylene terephthalate film may be subjected to the annealing treatment after being cut into a size that is easy to be handled, or may be subjected to the annealing treatment by being wound out from a roll and passed through an oven. From the viewpoint that the continuous treatment is enabled and the productivity is excellent, the method of winding the film out from a roll and passing the film through an oven is preferred.

In the resin constituting the polyethylene terephthalate film or the polyphenylene sulfide film used in the laminate according to the present invention, various additives such as an antioxidant, a heat stabilizer, a weathering stabilizer, an ultraviolet absorber, an organic lubricant, a pigment, a dye, organic or inorganic microparticles, a filler, an antistatic agent, a nucleating agent, and a crosslinking agent may be added to the extent that the characteristics thereof do not deteriorate.

The thickness of each of the film A and the film C is preferably 9 μm or more and 125 μm or less. In the case where the thickness is less than 9 μm, the thicknesses of each of the film A and the film C having high heat resistance is reduced, and the ratio of the thickness of the film B is increased. Therefore, the heat resistance of the laminate may decrease. In the case where the thickness of each of the film A and the film C is more than 125 μm, the ratio of the thicknesses of each of the film A and the film C increases, and the end tear resistance of the laminate decreases. Thus, the electrical insulating film for a motor may be broken in a case of being molded. In addition, a sheet or polyphenylene sulfide film made of aromatic polyamide fibers in the film A or film C having excellent heat resistance is higher in cost than the material of the film B, and may be disadvantageous from the viewpoint of economic efficiency. The phrase "molding of the electrical insulating film for a motor" refers to a step of inserting a laminate into a portion of a motor stator which is called a slot and is filled with a coil, and refers to a series of steps of bending the laminate into a U shape (a so-called U shape having 2 corners) according to a shape of the slot and inserting the laminate into the slot.

The thickness of the film B is preferably 75 μm or more and 300 μm or less. In the case where the thickness of the film B is less than 75 μm the mechanical strength and the end tear resistance of the laminate decrease, and in the case where the molding of the electrical insulating film for a motor is performed, the laminate may be broken or bent, resulting in poor processability. In particular, in the case where the film A and the film C are sheets made of aromatic polyamide fibers, the electrical insulation properties may deteriorate because the ratio of the thickness at which the electrical insulation properties decrease is increased. In the case where the thickness of the film B is 300 μm or more, the mechanical strength of the laminate becomes too high, so that the laminate is less likely to be bent in a U shape, and the processability may decrease.

From the viewpoint described above, as one aspect of the present invention, an electrical insulating film of a motor having the above-described laminate can be preferably exemplified.

EXAMPLES

[Method for Measuring Physical Properties]

Hereinafter, the configuration and effects of the present invention will be described more specifically with reference to Examples. The present invention is not limited to the following Examples. Prior to the description of each example, methods for measuring various physical properties will be described.

(1) Adhesion Strength

The film A, the film B, and the film C according to the present invention were bonded by the method described in Examples, and then aged for 72 hours in a thermostatic bath whose temperature was adjusted to 40° C. Three test pieces for measurement were cut out in a strip shape having a width of 10 mm from the bonded sample, a side including the film B according to the present invention was horizontally fixed, and a side of the film A or the film C was peeled off in a state of a peeling angle of 180° and a tensile speed of 200 mm/min to measure the adhesion strength. The measurement was performed once for each of the three strip-shaped test pieces, and an average value of the obtained strengths was defined as the value of the adhesion strength. The evaluation was performed according to the following criteria, and A and B were regarded as acceptable.

A: adhesion strength of 3 N/10 mm or more
B: adhesion strength of 2 N/10 mm or more and less than 3 N/10 mm
C: adhesion strength of less than 2 N/10 mm (2) Thermal Shrinkage Rate First, a 20 mm×150 mm laminate sample having a long side defined by any straight line was collected from the laminate. Next, the film A, the film C, and the adhesive layers were removed, and only the film B was isolated. The isolated film B was subjected to a heat treatment at 150° C. for 30 minutes in an oven (GPHH-202) manufactured by Espec Corporation, and then the dimensional change rate in the long side direction was measured based on JISC2151 (2006). Next, a sample of 20 mm×150 mm having a long side defined by a straight line obtained by rotating the long side of the previous sample rightward by 5° from the long side direction of the previous sample was collected and subjected to the same measurement, and this procedure was repeated until an angle with the long side direction of the first sample becomes 175°. The maximum value of all the obtained values was defined as the maximum value of the thermal shrinkage rate.

(3) Martens Hardness

The laminate was cut along a plane perpendicular to a film surface using a microtome. Next, only the portion of the film A or the film C was cut and removed using a cutting device SAICAS (DN-20S type) manufactured by Daipla Wintes Co., Ltd. to expose the adhesive layer with a size of 5 mm×5 mm or more. Based on the indentation test method in conformity with ISO14577, measurement was performed by pressing an indentor into the exposed adhesive layer surface using an ultramicro hardness test system (trade name: "PICODENTOR®" HM500, manufactured by Fisher Instruments K.K.). In order to eliminate the dependence on the thickness of the adhesive layer, the indentation load was set as small as 0.1 mN, and the indentation depth was set to about 1

(4) Measurement of Dispersive Component, Polar Component, and Hydrogen Bonding Component A laminate sample of 50 mm×50 mm was collected, and only the portion of the film A or the film C was cut and removed by using a cutting device SAICAS (DN-20S type) manufactured by Daipla Wintes Co., Ltd. to expose the adhesive layer with a size of 5 mm×5 mm or more. Next, using water, ethylene glycol, formamide, and diiodomethane, a contact angle with an adhesive layer surface was measured 5 times for each solution, and an average value of the contact angles for each liquid was determined. Using the average value of the contact angles, the value of each component was calculated using the following expression introduced from the extended Fowkes equation and the Young equation.

$$(\gamma Sd \cdot \gamma Ld)^{1/2} + (\gamma Sp \cdot \gamma Lp)^{1/2} + (\gamma Sh \cdot \gamma Lh)^{1/2} = (1 + \cos \theta)/2$$

In the expression, γLd, γLp, and γLh represent eigenvalues of the dispersive component, the polar component, and the hydrogen bonding component, of each of measurement liquids, respectively (according to the method IV based on Panzer (described in Japan Glue Association vol. 15, No. 3, p 96)), θ represents an average value of contact angles of the measurement liquids on the measurement surface, and γSd, γSp, and γSh represent values of the dispersive component, the polar component, and the hydrogen bonding component, on the surfaces of the adhesive layers, respectively. The values of the three components of the measurement surface were obtained by solving simultaneous equations obtained by assigning the eigenvalues and θ into the above expression.

(5) Tensile Elongation A measurement sample having a width of 10 mm and a length of 250 mm was collected from a laminate such that the longitudinal direction of the laminate was the length direction. The sample was pulled in the long side direction based on JISC2151 (2006), and the elongation when the laminate was broken was determined. The measurement was performed five times for each sample, and the average value of five measurements was defined as the tensile elongation.

In the case where the longitudinal direction could not be specified, the above-described measurement of the thermal shrinkage rate was performed, and the direction in which the thermal shrinkage rate was maximum was defined as the longitudinal direction.

(6) Elongation Retention Ratio

A measurement sample having a width of 10 mm and a length of 250 mm was collected from a laminate such that the longitudinal direction of the laminate was the length direction. The cut sample was treated in an oven (GPHH-202) manufactured by Espec Corporation under an environment of a temperature of 180° C. for 200 hours. The tensile elongation of the laminate before and after the treatment was measured based on JISC2151 (2006). The measurement was performed five times for each sample, and the average value of five measurements was defined as the tensile elongation. Regarding the obtained tensile elongation, a value obtained by dividing the tensile elongation after the treatment by the tensile elongation before the treatment was defined as the elongation retention ratio for heat resistance evaluation and evaluated according to the following criteria.

A: 70% or more
B: 50% or more and less than 70%
C: Less than 50%

(7) End Tear Resistance

A sample having a width of 20 mm and a length of 300 mm was collected from a laminate such that the longitudinal direction of the laminate was the length direction, and was measured using a test fitting B (V-shaped cut type) based on JISC2151 (2006). The obtained end tear resistance was evaluated according to the following criteria.

A: 750 N/20 mm or more
B: 300 N/20 mm or more and less than 750 N/20 mm
C: Less than 300 N/20 mm In the case where the longitudinal direction could not be specified, the above-described measurement of the thermal shrinkage rate was performed, and the direction in which the thermal shrinkage rate was maximum was defined as the longitudinal direction.

(8) Adhesion Area Ratio after Immersion into Auto Fluid

A measurement sample of 100 mm×100 mm was collected from a laminate. Next, the entire sample was immersed in a stainless steel container containing a pure auto fluid (MATIC FLUID S) manufactured by Nissan in a manner of being immersed in the auto fluid, water of 0.5 mass % relative to the amount of the auto fluid was further added to seal the container, and the sealed container was placed in an oven (GPHH-202) manufactured by Espec Corporation, and a heat treatment was performed at 150° C. for 10 hours. Next, the mass of the sample after the heat treatment was measured, and a portion where peeling occurred between the films and a portion where air bubbles were generated between the films were cut in the thickness direction so as to include the film A, the film B, and the film C. The mass of the sample after cutting was measured, and the ratio before and after cutting was defined as the adhesion area ratio. The adhesion area ratio was evaluated according to the following criteria.

A: The adhesion area ratio was 98% or more.
B: The adhesion area ratio was 95% or more and less than 98%.
C: The adhesion area ratio was less than 95%.

[Film Used as Each Layer]

1. Polyethylene Terephthalate (Hereinafter Referred to as PET) Film A (PET-A)

In a nitrogen atmosphere, 100 parts by mass of dimethyl terephthalate and 60 parts by mass of ethylene glycol were mixed at a temperature of 260° C. Thereafter, the temperature was lowered to 225° C., and 0.08 parts by mass of calcium acetate and 0.029 parts by mass of antimony trioxide were added thereto, then 16.9 parts by mass of ethylene glycol was gradually added over two hours while performing stirring to distill methanol, and a transesterification reaction was completed. Next, 0.16 parts by mass of lithium acetate and 0.11 parts by mass of trimethyl phosphate were added, and the mixture was transferred to a polymerization reaction tank. Next, a polymerization reaction was carried out under a final temperature of 285° C. and a reduced pressure of 13 Pa to obtain a polyester having an intrinsic viscosity (IV) of 0.54 and the number of terminal carboxy groups of 18 equivalent/t. The polyester was cut into rectangular bodies each having a size of 2 mm×4 mm×4 mm, dried at 160° C. for 6 hours, crystallized, and then subjected to solid phase polymerization at 220° C. for 20 hours under a reduced pressure condition of 65 Pa to obtain polyester resin pellets 1 having an intrinsic viscosity (IV) of 0.80, a carboxy group terminal group amount of 10 equivalent/t, and a melting point of 260° C.

Next, the polyester resin pellets 1 were dried in vacuum at 160° C. for 6 hours, and then fed to an extruder to perform melt extrusion at 295° C. The resultant product was filtered by a filter obtained by baking and compressing stainless steel fibers and having an average opening of 60 μm, and then was extruded into a sheet shape from a T-shaped die, wound around a mirror surface casting drum having a surface temperature of 20° C. using an electrostatic application casting method, and cooled and solidified. At this time, the melting time of the resin from a tip end of the extruder to the die was 2 minutes, and cold air having a temperature of 10° C. was blown from an opposite surface of the casting drum to the film at a wind speed of 20 m/s from slit nozzles with a gap of 2 mm installed in 12 stages in the longitudinal direction, and cooling was performed from both surfaces. This unstretched film was preheated to 80° C. with a preheating roll, stretched 3.3 times in the longitudinal direction by utilizing the difference in the peripheral speed between the rolls while heating to 90° C. with a radiation heater, and then cooled to 25° C. with a cooling roll to obtain a monoaxially oriented film. Both end portions of the monoaxially oriented film in the width direction were held with clips, preheated in an oven at an ambient temperature of 110° C., and subsequently stretched 3.7 times in the width direction in a stretching zone of 120° C. continuously. The obtained biaxially oriented film was subsequently subjected to a heat treatment at a heat fixing temperature of 215° C. for 10 seconds, and then subjected to a relaxation treatment of 5.0% by reducing the distance between clips facing each other in the width direction while cooling from 215° C. to 160° C. Thereafter, the film was cooled to 100° C. in the oven and then was taken out from the oven by separating the clips holding both end portions in the width direction of the film, followed by cutting and removing the both end portions in the width direction, and the film was wound to obtain a PET film A having a thickness of 125 μm. The physical properties of the obtained film are shown in Table 1.

2. PET Films B to J (PET-B to J)

PET films B to J were obtained in the same manner as in the production of the PET film A except that the thickness, the heat fixing temperature, and the annealing time were as shown in Table 1. The physical properties of the obtained films are shown in Table 1.

TABLE 1

| Film | Thickness (μm) | Heat fixing temperature (° C.) | Annealing time (sec) | Maximum value of thermal shrinkage rate (%) |
|---|---|---|---|---|
| PET-A | 125 | 215 | 0 | 2.3 |
| PET-B | 125 | 205 | 0 | 2.6 |
| PET-C | 125 | 190 | 0 | 3.0 |

TABLE 1-continued

| Film | Thickness (μm) | Heat fixing temperature (° C.) | Annealing time (sec) | Maximum value of thermal shrinkage rate (%) |
|---|---|---|---|---|
| PET-D | 125 | 180 | 0 | 3.3 |
| PET-E | 125 | 215 | 10 | 1.5 |
| PET-F | 125 | 215 | 60 | 0.1 |
| PET-G | 125 | 215 | 80 | 0.0 |
| PET-H | 75 | 215 | 0 | 2.3 |
| PET-I | 300 | 215 | 0 | 2.3 |
| PET-J | 350 | 215 | 0 | 2.3 |

3. Polyphenylene Sulfide (Hereinafter Referred to as PPS) Film K (PPS-K)

To an autoclave, 100 parts by mole of sodium sulfide nonahydrate, 45 parts by mole of sodium acetate, and 259 parts by mole of N-methyl-2-pyrrolidone (NMP) were charged, and the temperature was gradually increased to 220° C. while stirring the mixture to remove the contained water by distillation. In a system in which the dehydration was completed, 101 parts by mole of p-dichlorobenzene as a main component monomer and 0.2 parts by mole of 1,2,4-trichlorobenzene as an auxiliary component were added together with 52 parts by mole of NMP, and nitrogen was sealed under a pressure of 3 kg/cm$^2$ at a temperature of 170° C., followed by temperature rising and polymerization at a temperature of 260° C. for 4 hours. After completion of the polymerization, the reaction mixture was cooled, the polymer was precipitated in distilled water, and a small mass polymer was collected through a wire mesh having 150 mesh openings. The small mass polymer thus obtained was washed five times with distilled water of 90° C., and then dried at a temperature of 120° C. under reduced pressure to obtain a PPS raw powder having a melting point of 280° C. The obtained PPS raw powder was extruded into a gut shape by a twin-screw extruder having a diameter of 30 mm at a temperature of 320° C. and then cut to obtain PPS resin pellets 1.

Next, 7 wt % of a calcium carbonate powder having an average particle diameter of 1.0 μm was added to the PPS resin pellets 1, the mixture was uniformly dispersed and blended, extruded into a gut shape by a twin-screw extruder having a diameter of 30 mm at a temperature of 320° C., and then cut to obtain a calcium carbonate particle-containing PPS resin pellets 2.

The PPS resin pellets 1 and the PPS resin pellets 2 were mixed at a weight ratio of 90:10, dried at a temperature of 180° C. for 4 hours under a reduced pressure of 3 mmHg using a rotary vacuum dryer, and then fed to an extruder to perform melt extrusion at 310° C. The resultant product was filtered by a filter obtained by baking and compressing stainless steel fibers and having an average opening of 14 μm, and then was extruded into a sheet shape from a T-shaped die, wound around a mirror surface casting drum having a surface temperature of 25° C. using an electrostatic application casting method, and cooled and solidified. This unstretched film was preheated to 92° C. with a preheating roll, stretched 3.7 times in the longitudinal direction by utilizing the difference in the peripheral speed between the rolls while heating to 105° C. with a radiation heater, and then cooled to 25° C. with a cooling roll to obtain a monoaxially oriented film. Next, both ends of the monoaxially oriented film in the width direction were held with clips, preheated in an oven at an ambient temperature of 100° C., and subsequently stretched 3.4 times in the width direction in a stretching zone of 100° C. continuously. The obtained biaxially oriented film was subsequently subjected to a heat treatment in a heating zone at 260° C. for 6 seconds, and then subjected to a relaxation treatment of 5.0% by reducing the distance between clips facing each other in the width direction while cooling from 260° C. to 200° C. Thereafter, the film was cooled to 115° C. in the oven and was taken out from the oven by separating the clips holding both ends of the film in the width direction, followed by cutting and removing the both ends of the film in the width direction, and the film was wound after being conveyed by a conveying roll to obtain a biaxially oriented film having a thickness of 16 μm. Next, the obtained film was subjected to a corona discharge treatment at a treatment intensity E value of 30 W·min/m² only on one side thereof in an air atmosphere to obtain a PPS film K. The properties of the obtained PPS film are shown in Table 2. The E value refers to the treatment intensity of the discharge treatment to the film surface defined by the following expression.

$E \text{ value} = [(\text{applied voltage: V}) \times (\text{applied current: A})] / [(\text{treatment speed: m/min}) \times (\text{electrode width: m})]$ 4. PPS Films L to P (PPS-L to P)

PPS films L to P were obtained in the same manner as in the production of the PPS film K except that the thickness was as shown in Table 2. The physical properties of the obtained films are shown in Table 2.

TABLE 2

| Film | Thickness (μm) | Maximum value of thermal shrinkage rate (%) |
|---|---|---|
| PPS-K | 16 | 1.5 |
| PPS-L | 115 | 1.5 |
| PPS-M | 115 | 3.0 |

TABLE 2-continued

| Film | Thickness (μm) | Maximum value of thermal shrinkage rate (%) |
|---|---|---|
| PPS-N | 115 | 0.1 |
| PPS-O | 115 | 3.3 |
| PPS-P | 115 | 0.0 |

5. Sheets Q and R Made of Aromatic Polyamide Fibers (Hereinafter Referred to as PA) (PA-Q and R)

As a sheet made of aromatic polyamide fibers, a paper-like sheet that is aramid paper "NOMEX®" manufactured by Dupont Teijin Advanced Papers Ltd. was used. The kinds of paper-like sheets are shown in Table 3.

TABLE 3

| Film | | Thickness (μm) |
|---|---|---|
| PA-Q | NOMEX ® manufactured by Dupont Teijin Advanced Papers Ltd. | 50 |
| PA-R | | 80 |

6. Adhesives a to g 100 parts by mass of a dry laminating agent "DYNA-GRAND®" LIS-7100 manufactured by Toyo-Morton, Ltd., which was a polyether resin having a hydroxy group as an active hydrogen group, Z4470 BA manufactured by Sumika Covestro Urethane Co., Ltd., which was a curing agent and contained a nurate-modified isophorone diisocyanate resin as a main component, and ethyl acetate were weighed in a formulation shown in Table 4, and stirred for 15 minutes to obtain adhesives a to g as adhesives each having a solid content concentration of 33.5 mass %. The reaction equivalent ratio of the isocyanate to the polyether resin having an active hydrogen group of each adhesive is represented by NCO/OH as shown in Table 4.

TABLE 4

| | | | Adhesive a | Adhesive b | Adhesive c | Adhesive d |
|---|---|---|---|---|---|---|
| Polyether resin | "DYNAGRAND ®" LIS-7100 manufactured by Toyo-Morton, Ltd. (solid content concentration: 50 mass %) | Parts by mass | 100 | 100 | 100 | 100 |
| Curing agent | Z4470 BA manufactured by Sumika Covestro Urethane Co., Ltd. (solid content concentration: 70 mass %) | Parts by mass | 7 | 5.5 | 8.5 | 9.3 |
| Diluent | Ethyl acetate | Parts by mass | 56.9 | 55.6 | 58.5 | 59.4 |
| Solid content concentration of coating agent | | Mass % | 33.5 | 33.5 | 33.5 | 33.5 |
| NCO/OH | | | — | 0.73 | 0.57 | 0.87 | 0.95 |

| | | | Adhesive e | Adhesive f | Adhesive g |
|---|---|---|---|---|---|
| Polyether resin | "DYNAGRAND ®" LIS-7100 manufactured by Toyo-Morton, Ltd. (solid content concentration: 50 mass %) | Parts by mass | 100 | 100 | 100 |

TABLE 4-continued

| | | | | | |
|---|---|---|---|---|---|
| Curing agent | Z4470 BA manufactured by Sumika Covestro Urethane Co., Ltd. (solid content concentration: 70 mass %) | Parts by mass | 10 | 3 | 15 |
| Diluent | Ethyl acetate | Parts by mass | 60.2 | 52.5 | 65.6 |
| Solid content concentration of coating agent | | Mass % | 33.5 | 33.5 | 33.5 |
| NCO/OH | | — | 1.02 | 0.32 | 1.53 |

7. Adhesives h and i

A dry laminating agent "DYNAGRAND®" TKS-9761 manufactured by Toyo-Morton, Ltd., which was a polyester resin having a hydroxy group as an active hydrogen group, CAT-10 manufactured by Toyo-Morton, Ltd., which was a curing agent and contained a nurate-modified tolylene diisocyanate resin as a main component, and ethyl acetate were weighed in a formulation shown in Table 5, and stirred for 15 minutes to obtain adhesives h and i as adhesives each having a solid content concentration of 33.5 mass %.

TABLE 5

| | | | Adhesive h | Adhesive i |
|---|---|---|---|---|
| Polyester resin | "DYNAGRAND ®" TKS-9761 manufactured by Toyo-Morton, Ltd. (solid content concentration: 50 mass %) | Parts by mass | 100 | 100 |
| Curing agent | CAT-10 manufactured by Toyo-Morton, Ltd. (solid content concentration: 75 mass %) | Parts by mass | 7 | 10 |
| Diluent | Ethyl acetate | Parts by mass | 60.4 | 61.6 |
| Solid content concentration of coating agent | | Mass % | 33.5 | 33.5 |
| NCO/OH | | — | 0.75 | 1.05 |

8. Adhesive j

"LEO COAT®" S-8000E manufactured by Toray Coatex Co., Ltd., which was a polyacrylic resin having a hydroxy group as an active hydrogen group, "Coronate®" HL manufactured by Tosoh Corporation, which was a curing agent and contained a hexamethylene diisocyanate resin as a main component, and ethyl acetate were weighed in a formulation shown in Table 6, and stirred for 15 minutes to obtain an adhesive j as an adhesive having a solid content concentration of 13.5 mass %.

TABLE 6

| | | | Adhesive j |
|---|---|---|---|
| Polyacrylic resin | "LEO COAT ®" S-8000E manufactured by Toray Coatex Co., Ltd. (solid content concentration: 20 mass %) | Parts by mass | 100 |
| Curing agent | "Coronate ®" HL manufactured by Tosoh Corporation (solid content concentration: 75 mass %) | Parts by mass | 10.7 |
| Diluent | Ethyl acetate | Parts by mass | 96.9 |
| Solid content concentration of coating agent | | Mass % | 13.5 |
| NCO/OH | | — | 0.78 |

Examples 1 to 17 and Comparative Examples 1 to 5

An adhesive was applied to the film A using a wire bar and dried at 80° C. for 60 seconds to form an adhesive layer AB. Next, the film B was laminated in a manner of being in contact with the adhesive layer AB, thereby producing an intermediate laminate. Next, an adhesive was applied to the film C using a wire bar and dried at 80° C. for 60 seconds to form an adhesive layer BC. The intermediate laminate was laminated such that a surface of the film B of the intermediate laminate was in contact with the adhesive layer BC of the film C to obtain a laminate. The kinds of the film A, the film B, the film C, the adhesive layer AB, and the adhesive layer BC are as shown in Table 7. The characteristic evaluation results are shown in Table 8.

Examples 18 to 21 and Comparative Examples 6 to 9

The adhesive layer AB was applied to the film B using a wire bar and dried at 80° C. for 60 seconds to form an adhesive layer. Next, the film A was laminated in a manner of being in contact with the adhesive layer AB, thereby producing an intermediate laminate. Next, an adhesive was applied to a surface of the film B of the intermediate laminate using a wire bar and dried at 80° C. for 60 seconds to form an adhesive layer BC. The film C was laminated in a manner of being in contact with the adhesive layer BC to obtain a laminate. The kinds of the film A, the film B, the film C, the adhesive layer AB, and the adhesive layer BC are as shown in Table 7. The characteristic evaluation results are shown in Table 8.

TABLE 7

| | Film A | | Film B | | Film C | |
| --- | --- | --- | --- | --- | --- | --- |
| | Composition | Thickness (µm) | Composition | Thickness (µm) | Composition | Thickness (µm) |
| Example 1 | PPS-K | 16 | PET-A | 125 | PPS-K | 16 |
| Example 2 | PPS-K | 16 | PET-A | 125 | PPS-K | 16 |
| Example 3 | PPS-K | 16 | PET-A | 125 | PPS-K | 16 |
| Example 4 | PPS-K | 16 | PET-A | 125 | PPS-K | 16 |
| Example 5 | PPS-K | 16 | PET-A | 125 | PPS-K | 16 |
| Example 6 | PPS-K | 16 | PET-C | 125 | PPS-K | 16 |
| Example 7 | PPS-K | 16 | PET-C | 125 | PPS-K | 16 |
| Example 8 | PPS-K | 16 | PET-C | 125 | PPS-K | 16 |
| Example 9 | PPS-K | 16 | PET-E | 125 | PPS-K | 16 |
| Example 10 | PPS-K | 16 | PET-F | 125 | PPS-K | 16 |
| Example 11 | PPS-K | 16 | PET-F | 125 | PPS-K | 16 |
| Example 12 | PPS-K | 16 | PET-H | 75 | PPS-K | 16 |
| Example 13 | PPS-K | 16 | PET-I | 300 | PPS-K | 16 |
| Example 14 | PPS-K | 16 | PET-J | 350 | PPS-K | 16 |
| Example 15 | PPS-K | 16 | PET-A | 125 | PPS-K | 16 |
| Example 16 | PPS-K | 16 | PET-A | 125 | PPS-K | 16 |
| Example 17 | PPS-K | 16 | PET-A | 125 | PPS-K | 16 |
| Example 18 | PA-Q | 50 | PPS-L | 115 | PA-Q | 50 |
| Example 19 | PA-R | 80 | PPS-L | 115 | PA-R | 80 |
| Example 20 | PA-Q | 50 | PPS-M | 115 | PA-Q | 50 |
| Example 21 | PA-Q | 50 | PPS-N | 115 | PA-Q | 50 |
| Comparative Example 1 | PPS-K | 16 | PET-A | 125 | PPS-K | 16 |
| Comparative Example 2 | PPS-K | 16 | PET-A | 125 | PPS-K | 16 |
| Comparative Example 3 | PPS-K | 16 | PET-D | 125 | PPS-K | 16 |
| Comparative Example 4 | PPS-K | 16 | PET-D | 125 | PPS-K | 16 |
| Comparative Example 5 | PPS-K | 16 | PET-G | 125 | PPS-K | 16 |
| Comparative Example 6 | PA-M | 50 | PPS-L | 115 | PA-M | 50 |
| Comparative Example 7 | PA-N | 80 | PPS-L | 115 | PA-N | 80 |
| Comparative Example 8 | PA-Q | 50 | PPS-O | 115 | PA-Q | 50 |
| Comparative Example 9 | PA-Q | 50 | PPS-P | 115 | PA-Q | 50 |

| | Adhesive | | | | |
| --- | --- | --- | --- | --- | --- |
| | Composition | Coating amount (g/m²) | Martens hardness (N/mm²) | Dispersive component (mN/m) | Sum of polar component and hydrogen bonding component (mN/m) |
| Example 1 | Adhesive a | 8 | 1.5 | 24.4 | 15.4 |
| Example 2 | Adhesive b | 8 | 1.0 | 20.1 | 20.1 |
| Example 3 | Adhesive c | 8 | 2.1 | 27.9 | 10.0 |
| Example 4 | Adhesive d | 8 | 3.5 | 29.0 | 7.5 |
| Example 5 | Adhesive e | 8 | 4.0 | 30.0 | 5.0 |
| Example 6 | Adhesive a | 8 | 1.5 | 24.4 | 15.4 |
| Example 7 | Adhesive b | 8 | 1.0 | 20.1 | 20.1 |

TABLE 7-continued

|  |  |  |  |  |  |
|---|---|---|---|---|---|
| Example 8 | Adhesive d | 8 | 3.5 | 30.0 | 5.0 |
| Example 9 | Adhesive e | 8 | 4.0 | 24.4 | 15.4 |
| Example 10 | Adhesive a | 8 | 1.5 | 24.4 | 15.4 |
| Example 11 | Adhesive b | 8 | 1.0 | 20.1 | 20.1 |
| Example 12 | Adhesive a | 8 | 1.5 | 24.4 | 15.4 |
| Example 13 | Adhesive a | 8 | 1.5 | 24.4 | 15.4 |
| Example 14 | Adhesive a | 8 | 1.5 | 24.4 | 15.4 |
| Example 15 | Adhesive h | 8 | 3.3 | 39.8 | 19.8 |
| Example 16 | Adhesive i | 8 | 4.0 | 40.5 | 17.3 |
| Example 17 | Adhesive j | 8 | 1.8 | 27.5 | 4.5 |
| Example 18 | Adhesive a | 8 | 1.5 | 24.4 | 15.4 |
| Example 19 | Adhesive a | 8 | 1.5 | 24.4 | 15.4 |
| Example 20 | Adhesive a | 8 | 1.5 | 24.4 | 15.4 |
| Example 21 | Adhesive a | 8 | 1.5 | 24.4 | 15.4 |
| Comparative Example 1 | Adhesive f | 8 | 0.8 | 19.1 | 23.0 |
| Comparative Example 2 | Adhesive g | 8 | 4.2 | 32.3 | 3.5 |
| Comparative Example 3 | Adhesive a | 8 | 1.5 | 24.4 | 15.4 |
| Comparative Example 4 | Adhesive e | 8 | 4.0 | 30.0 | 5.0 |
| Comparative Example 5 | Adhesive b | 8 | 1.0 | 20.1 | 20.1 |
| Comparative Example 6 | Adhesive f | 8 | 0.8 | 19.6 | 19.8 |
| Comparative Example 7 | Adhesive g | 8 | 4.2 | 32.3 | 3.5 |
| Comparative Example 8 | Adhesive a | 8 | 1.5 | 24.4 | 15.4 |
| Comparative Example 9 | Adhesive a | 8 | 1.5 | 24.4 | 15.4 |

TABLE 8

|  | Adhesion strength | Elongation retention ratio | End tear resistance | Adhesion area ratio after immersion into auto fluid |
|---|---|---|---|---|
| Example 1 | A | A | A | A |
| Example 2 | A | A | A | B |
| Example 3 | A | A | A | A |
| Example 4 | B | A | A | A |
| Example 5 | B | A | A | A |
| Example 6 | A | A | A | B |
| Example 7 | A | A | A | B |
| Example 8 | B | A | A | A |
| Example 9 | A | A | A | A |
| Example 10 | B | A | A | A |
| Example 11 | A | A | A | B |
| Example 12 | A | A | B | A |
| Example 13 | A | B | A | A |
| Example 14 | A | C | A | A |
| Example 15 | A | A | A | A |
| Example 16 | A | A | A | B |
| Example 17 | A | A | A | B |
| Example 18 | A | A | A | A |
| Example 19 | A | A | A | A |
| Example 20 | A | A | A | B |
| Example 21 | B | A | A | A |
| Comparative Example 1 | A | A | A | C |
| Comparative Example 2 | C | A | A | C |
| Comparative Example 3 | A | A | A | C |
| Comparative Example 4 | B | A | A | C |
| Comparative Example 5 | C | A | A | A |
| Comparative Example 6 | A | A | A | C |
| Comparative Example 7 | A | A | A | C |
| Comparative Example 8 | A | A | A | C |
| Comparative Example 9 | C | A | A | A |

INDUSTRIAL APPLICABILITY

The present invention can provide a laminate excellent in adhesion, processability, oil resistance, heat resistance, and moisture and heat resistance. The laminate according to the present invention can be suitably used for an electrical insulating film of a motor.

REFERENCE SIGNS LIST

1: Film A
2: Adhesive layer AB
3: Film B
4: Adhesive layer BC
5: Film C

The invention claimed is:
1. A laminate comprising a film A, a film B, and a film C in this order via adhesive layers,
wherein the adhesive layers comprise an adhesive layer AB and an adhesive layer BC,
the adhesive layer AB exists between the film A and the film B, and the adhesive layer BC exists between the film B and the film C,
a maximum value of a thermal shrinkage rate of the film B at 150° C. for 30 minutes is 0.1% or more and 3.0% or less, the adhesive layer AB and the adhesive layer BC each have a Martens hardness of 1.0 N/mm² or more and 4.0 N/mm² or less, and when the laminate is immersed in an automatic transmission fluid and subjected to a heat treatment at 150° C. for 10 hours, and after the heat treatment a portion of the laminate having peeling between the film A, the film B, and the film C and a portion of the laminate having air bubbles between the film A, the film B, and the film C are cut from the laminate, an adhesion area ratio between the film A and the film B via the adhesive layer AB and an adhesion area ratio between the film B and the film C via the adhesive layer BC are both 95% or more, the adhesion area ratio being a ratio of a mass of the laminate before and after the portion of the laminate having peeling and the portion of the laminate having air bubbles are cut from the laminate, wherein a dispersive component of surface free energy of each of the adhesive layer AB and the adhesive layer BC is 20 mN/m or more and 40 mN/m or less, and a sum of a polar component and a hydrogen bonding component of each of the adhesive layer AB and the adhesive layer BC is 5 mN/m or more and 20 mN/m or less, wherein each of the adhesive layer AB and the adhesive layer BC contains, as main components, a polyether resin having an active hydrogen group and an isocyanate resin and/or contains, as main components, a polyester resin having an active hydrogen group and an isocyanate resin, and wherein each of the film A and the film C is at least one selected from a sheet made of aromatic polyamide fibers and a polyphenylene sulfide film, and the film B is at least one selected from a polyphenylene sulfide film, a polyimide film, a polyethylene naphthalate film, and a polyethylene terephthalate film.

2. The laminate according to claim 1, wherein the isocyanate resin contains, as a main component, a nurate-modified product of isophorone diisocyanate.

3. The laminate according to claim 1, wherein the active hydrogen group of the polyether resin and/or the polyester resin is a hydroxy group, and a reaction equivalent ratio (NCO/OH) of the hydroxy group is 0.7 or more and 0.95 or less.

4. The laminate according to claim 1, wherein each of the film A and the film C is a sheet made of aromatic polyamide fibers, and the film B is at least one selected from a polyphenylene sulfide film, a polyimide film, a polyethylene naphthalate film, and a polyethylene terephthalate film.

5. The laminate according to claim 1, wherein each of the film A and the film C is a polyphenylene sulfide film, and the film B is a polyethylene terephthalate film.

6. The laminate according to claim 1, being used for an electrical insulating film of a motor.

* * * * *